United States Patent [19]
Koehrsen

[11] Patent Number: 6,073,068
[45] Date of Patent: *Jun. 6, 2000

[54] METHOD FOR DETERMINING THE ELEVATION OF A POINT ON A WORK SITE REPRESENTED IN A TRIANGULAR IRREGULAR NETWORK

[75] Inventor: Craig L. Koehrsen, Peoria, Ill.

[73] Assignee: Caterpillar Inc., Peoria, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/761,100

[22] Filed: Dec. 5, 1996

[51] Int. Cl.[7] ................................... G05B 19/00
[52] U.S. Cl. ................... 701/50; 37/347; 37/348; 172/4.5; 172/5
[58] Field of Search ................... 701/50; 37/347, 37/348; 172/4.5, 5

[56] References Cited

U.S. PATENT DOCUMENTS 5,735,352  4/1998  Henderson et al. .............. 701/50

*Primary Examiner*—William A. Cuchlinski, Jr.
*Assistant Examiner*—Yonel Beaulieu
*Attorney, Agent, or Firm*—James R. Yee; Marla L. Hudson; Kevin M. Kercher

[57] ABSTRACT

A site database structure for storing elevation data for access by an application program being executed on a control system on a work machine. The data is stored in a Triangular Irregular Network (TIN). The elevation of a point on the work site based on the three points forming the triangle containing the point.

17 Claims, 7 Drawing Sheets

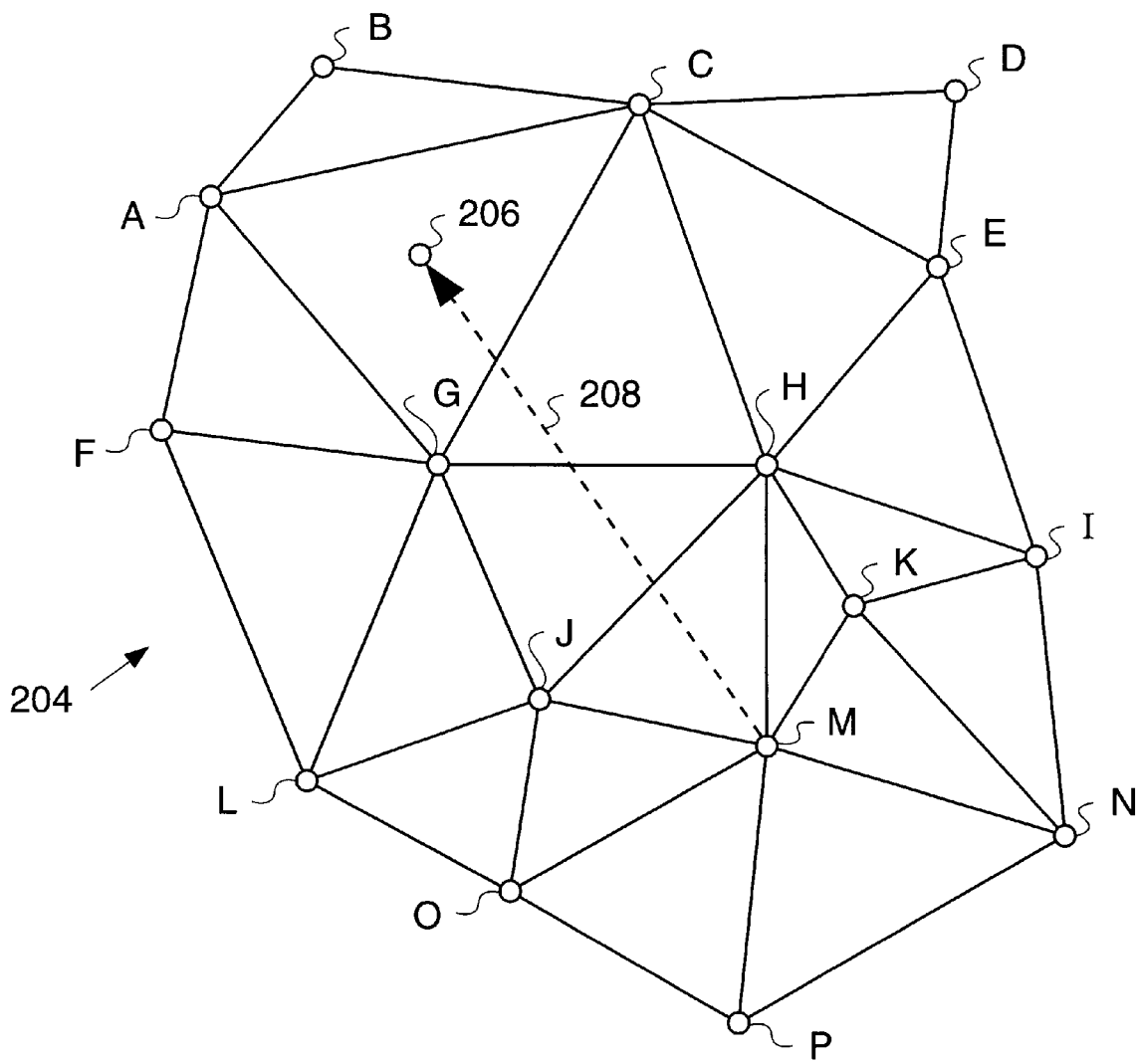

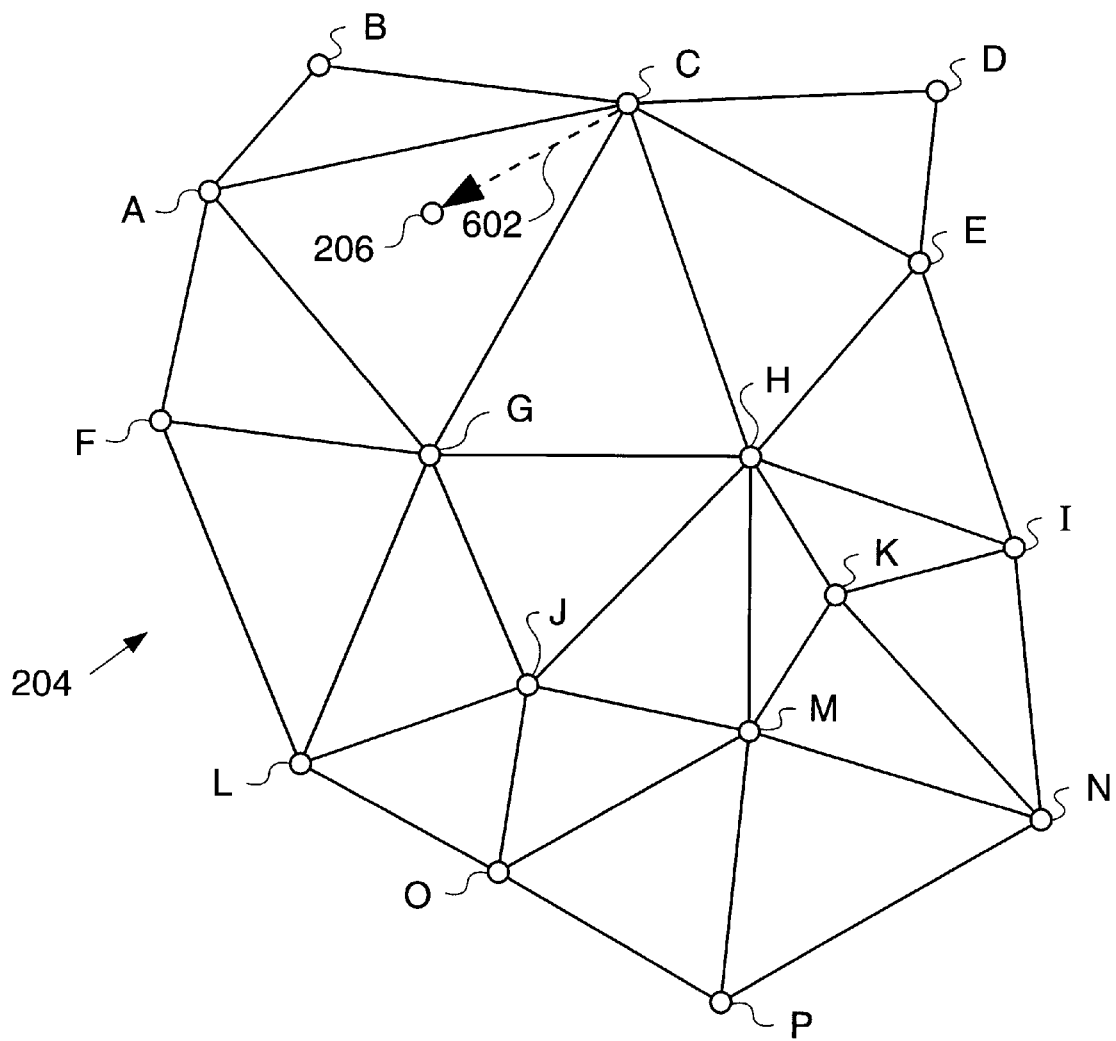

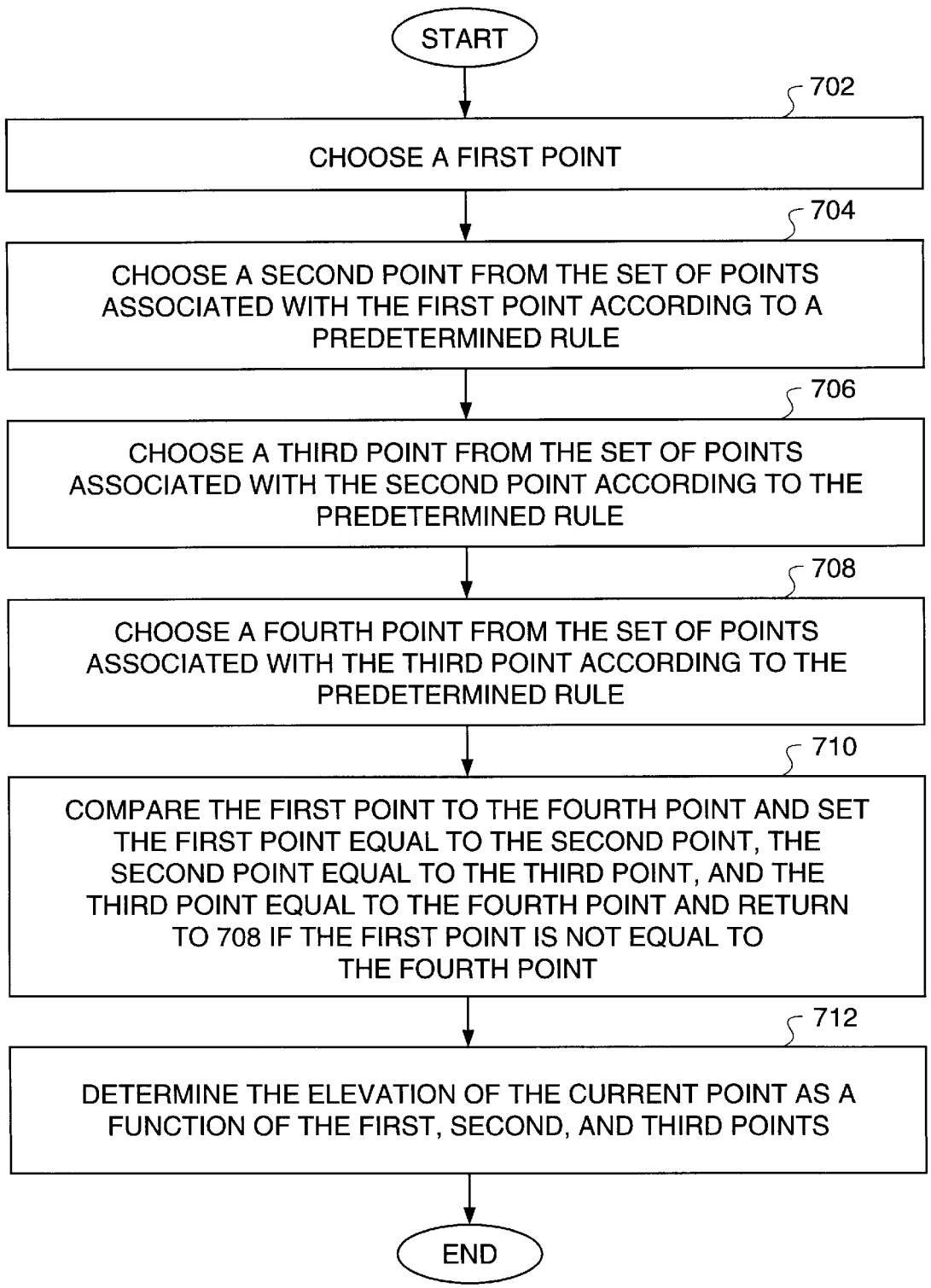

METHOD FOR DETERMINING THE ELEVATION OF A POINT ON A WORK SITE REPRESENTED IN A TRIANGULAR IRREGULAR NETWORK

The invention described herein was made in the performance of work under NASA Cooperative Agreement No. NCC2-9007, Contract No. TRP SOL93-29 and is subject to the provisions of Section 305 of the National Aeronautics and Space Act of 1958 (42 U.S.C. 2457). The Government has certain rights to this invention.

TECHNICAL FIELD

This invention relates generally to a site database structure and, more particularly, to a method for determining the elevation of a point on a work site represented in a triangular irregular network.

BACKGROUND ART

Work machine such as mining shovels and the like are used for excavation work. Much effort has been aimed at automating the work cycle or portions of the work cycle of such machines.

One such system is disclosed in U.S. Pat. No. 5,404,661 issued to William C. Sahm et al on Apr. 11, 1995. The Sahm system, aimed at a mining shovel, determines the position of a bucket of a work implement as it excavates, i.e., modifies the work site. The position of the bucket as it modifies the work site is used to update a site model or database. The current site model is compared with a desired site model by a differencing algorithm. The output of the differencing algorithm is used to control operation of the work machine or is displayed to the operator to assist in operation.

The work site covers a generally large area. Thus, the database is typically large as well, requiring a resultant large amount of storage space.

There are three general approaches for the structure of the site model. In the first approach, the entire work site is divided into a grid. Each square of the grid represents a fixed point (with fixed X and Y coordinates) in the work site. Data associated with the site is stored at each square. The problem with this approach is that the grid must cover the entire site. Generally, there will be large portions of the site which will not be affected or worked on by the work machine. Thus, large amounts of storage space may be wasted.

In the second approach, only those points required are stored. However, since the grid structure is not used, each of these points requires that the X and Y coordinates of the point be stored as well. This also wastes storage space.

In the third approach, a Triangular Irregular Network, or TIN, is used. The TIN is composed of a plurality of points having X and Y coordinates. For each point in the network, the database stores elevation information and, for each point, the other points to which it is connected. The TIN is used to give a better approximation or representation of the work site. One factor which allows the TIN to be more accurate is that the points composing the network are not regular. The positions of the points are dictated by the surface of the work site. As a result, given a point contained within one of the triangles of the network, it becomes more difficult to determine which triangle includes the point and thus harder to determine its elevation.

The present invention is directed at overcoming one or more of the problems as set forth above.

DISCLOSURE OF THE INVENTION

In one aspect of the present invention, a method for determining an elevation of a current point on a work site is provided. The current point has known X and Y coordinates. The work site is modeled in a database using a triangular irregular network composed of a plurality of points. Each point has associated X and Y coordinates and an elevation and is associated with a set of other points in the network to form triangles. The method includes the steps of choosing a first point, choosing second, third, and fourth points according to a predetermined rule, comparing the first point to the fourth point and setting the first point equal to the second point, the second point equal to the third point, and the third point equal to the fourth point and determining a new fourth point if the first point is not equal to the fourth point. The elevation of the current point is determined as a function of the first, second, and third points.

BRIEF DESCRIPTION OF THE DRAWINGS

FIG. 2 is a diagrammatic representation of a database structure for representing and storing parameter values associated with a work site, illustrating a first step in determining the elevation of a current point;

FIG. 6 is a diagrammatic representation of a database structure for representing and storing parameter values associated with a work site, illustrating a fifth step in determining the elevation of a current point; and FIG. 7 is a flow diagram illustrating operation of a method for determining an elevation of a current point on a work site, according to an embodiment of the present invention.

BEST MODE FOR CARRYING OUT THE INVENTION

Figure 1:
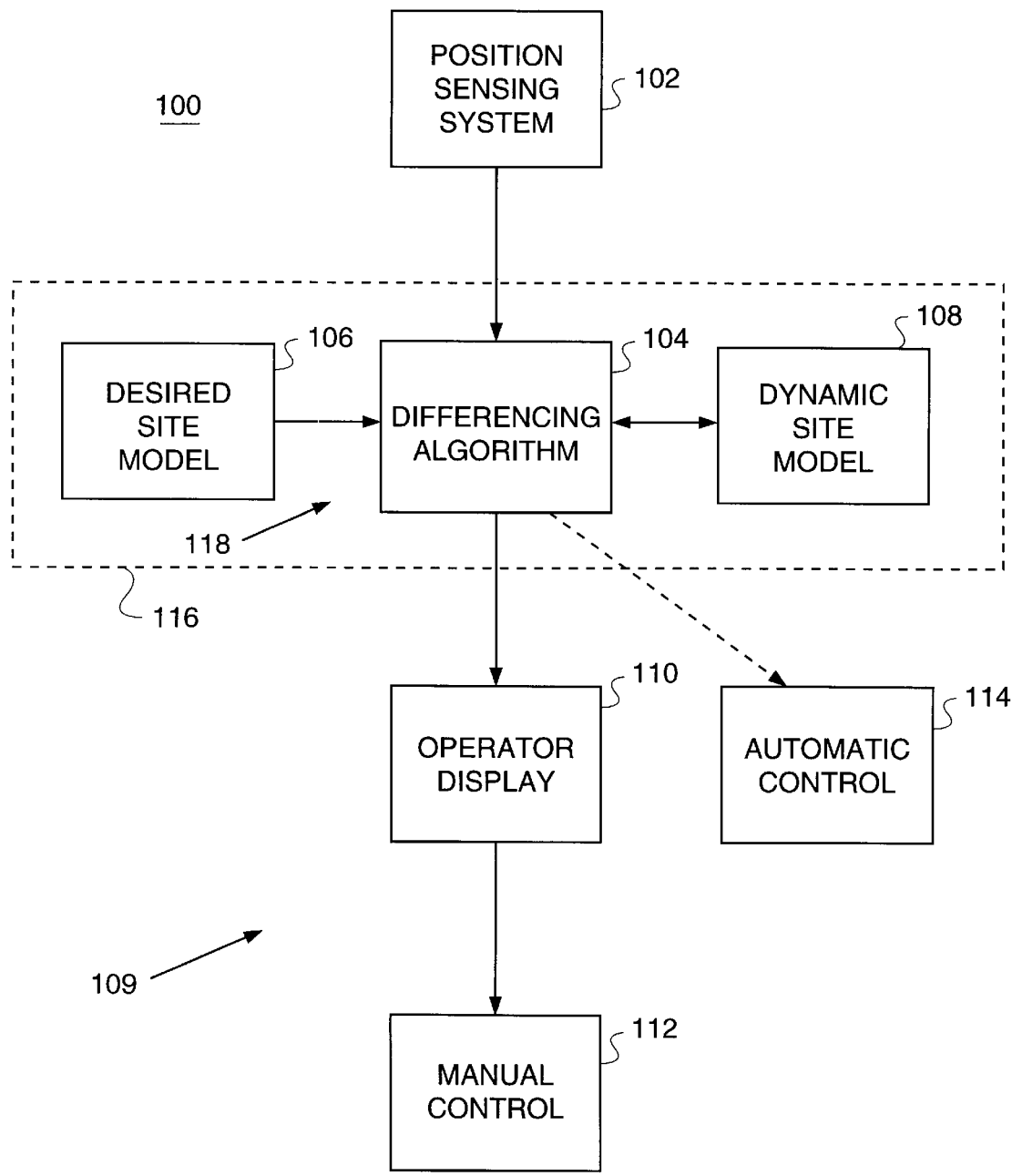
FIG. 1 is a block diagram of an apparatus for implementing the present invention, according to one embodiment.

With reference to FIGS. 1–6, the present invention provides an apparatus, method, and database structure for representing a work site 202 in a site database 204.

In the preferred embodiment, the present invention is used in conjunction with a mobile earthmoving or work machine (not shown) such as a track-type tractor or dozer, a profiler, a motorgrader, a scraper, a road reclaimer, a wheel loader and the like.

A position sensing system 102 determines the position of a point located on the mobile machine. The point may be located on the body of the machine or on a work implement (not shown) of the mobile machine. As discussed below, the position of at least one reference point located on the machine is used to dynamically update the site database 204.

In the preferred embodiment, the position sensing system 102 includes a three-dimensional positioning system with an external reference, for example, (but not limited to) 3-D laser, Global Positioning Systems (GPS), GPS/laser combinations, radio triangulation, microwave, or radar. Position coordinates of the reference point are determined as the mobile machine operates within the work site 202.

A micro-processor based controller 116 is coupled to the position sensing system 102. The controller 116 receives the position coordinates from the position sensing system 102 and updates a dynamic site model 108. The controller 116 may also perform other functions as described below.

The position coordinates are supplied as a series of discrete points to a differencing algorithm 104.

The controller 116 includes a storage memory 118 for storing a desired site model 106 and the dynamic site model 108. The desired site model 106 and the dynamic site model 108 each includes a site database 204. Preferably, the desired site and the dynamic site databases 204 store data representing site elevations (desired elevation and current elevation, respectively). However, the site databases 204 may additionally store values of other parameters of the work site 202, e.g., material or ore type, previous elevation, number of passes by the work machine.

The differencing algorithm 104 is implemented in software on the controller 116 and calculates the difference between the desired site model 106 and the dynamic site model 108.

The differencing algorithm 104 is coupled to a directing means 109. The directing means 109 accesses the databases and responsively directs operation of the working machine. The directing means 109 preferably includes an operator display 110. The operator display 110 includes a graphical representation of the work site 202 illustrating the stored values of the parameter(s). The operator display 110 is used to assist the operator in manual control 112 of the work machine. Optionally, the directing means 109 may include an automatic control 114 for autonomously controlling operation of the work machine in response to the data stored in the databases.

The desired site model 106 and the dynamic site model 108 are preferably stored in the memory 118. The memory 118 may be any suitable memory structure for storing data including, but not limited to, random access memory, programmable read only memory, fixed disk drives, removable disk drives, and the like.

The memory 118 stores data for access by an application program being executed on the controller 116. The memory 118 stores data in a data structure. The data structure includes information resident in the databases used by the application program.

With reference to FIG. 2, elevation information is stored in the site database 204 using a data structure called a Triangular Irregular Network or TIN. The TIN is composed of a plurality of points (Points A–P). Each point has associated known X and Y coordinates and a known elevation value. The site database 204 also includes, for each point, a list of the other points with which the point is linked to form triangles. For the sample network such in FIG. 2, the data stored in the site database 204 is listed in Table One.

TABLE ONE

| Point | X,Y | Elevation | Associated Points |
|---|---|---|---|
| A | $X_A, Y_A$ | $E_A$ | B, C, F, G |
| B | $X_B, Y_B$ | $E_B$ | A, C |
| C | $X_C, Y_C$ | $E_C$ | A, B, D, E, H, G |
| D | $X_D, Y_D$ | $E_D$ | C, E |
| E | $X_E, Y_E$ | $E_E$ | C, D, H, I |
| F | $X_F, Y_F$ | $E_F$ | A, G, L |
| G | $X_G, Y_G$ | $E_G$ | A, C, F, H, J, L |
| H | $X_H, Y_H$ | $E_H$ | C, E, G, I, J, K, M |
| I | $X_I, Y_I$ | $E_I$ | E, H, K, N |

TABLE ONE-continued

| Point | X,Y | Elevation | Associated Points |
|---|---|---|---|
| J | $X_J, Y_J$ | $E_J$ | G, H, L, M, O |
| K | $X_K, Y_K$ | $E_K$ | H, I, M, N |
| L | $X_L, Y_L$ | $E_L$ | F, G, J, O |
| M | $X_M, Y_M$ | $E_M$ | H, J, K, N, O, P |
| N | $X_N, Y_N$ | $E_N$ | I, K, M, P |
| O | $X_O, Y_O$ | $E_O$ | J, L, M, P |
| P | $X_P, Y_P$ | $E_P$ | M, N, O |

Additionally, for each point, the angle between each line segment formed by the point and the other points and a predefined vector, e.g., a horizontal vector, are stored. For example, for point A there are four angles stored: $ANGLE_{AB}$, $ANGLE_{AC}$, $ANGLE_{AG}$ and, $ANGLE_{AF}$ (the angles defined by the horizontal axis and lines segments AB, AC, AG, and AF, respectively).

For either display purposes or for automatic control purposes, given a specific or current point 206 (X and Y coordinates) it becomes necessary to determine the elevation of the current point 206 as represented by the site database 204.

With reference to FIG. 7, the present invention provides a method for determining the elevation of the current point 206 on the work site 202.

In a first step 702, a first point is chosen. The first point may be an arbitrary point or could be any point or the last point used by the application program. In the example of FIG. 2, the first point is point M.

In a second step, a second point is chosen. The second point is chosen from the list of points connected to the first point according to a predetermined rule. For example, with the first point equal to point M, the points connected to point M are points H, J, K, N, O, and P.

In one embodiment of the predetermined rule, a vector 208 between the first point (point M) and the current point 206 is determined. Then the angle between the vector 208 and the predefined vector is determined. This angle is compared with the angles stored with the first point, i.e., the angles formed by the line segments between point M and the other linked points and the predefined vector. The first stored angle which is counter-clockwise from the vector 208 is determined. The second point is deemed to be the linked point which defines this angle.

With reference to FIG. 2, the first angle in a counter-clockwise direction is defined by point J. Point J becomes the second point.

Other predetermined rules may also be used. For example, the first stored angle in a clockwise direction could be used. Other predetermined rules may also be applied without departing from the spirit of the invention. The important factor in applying the rule is to use the same rule for determining all subsequent points, as explained below.

Returning to FIG. 7, in a third step 706 a third point from the set of points associated with the second point is chosen according to the predetermined rule.

Figure 3:
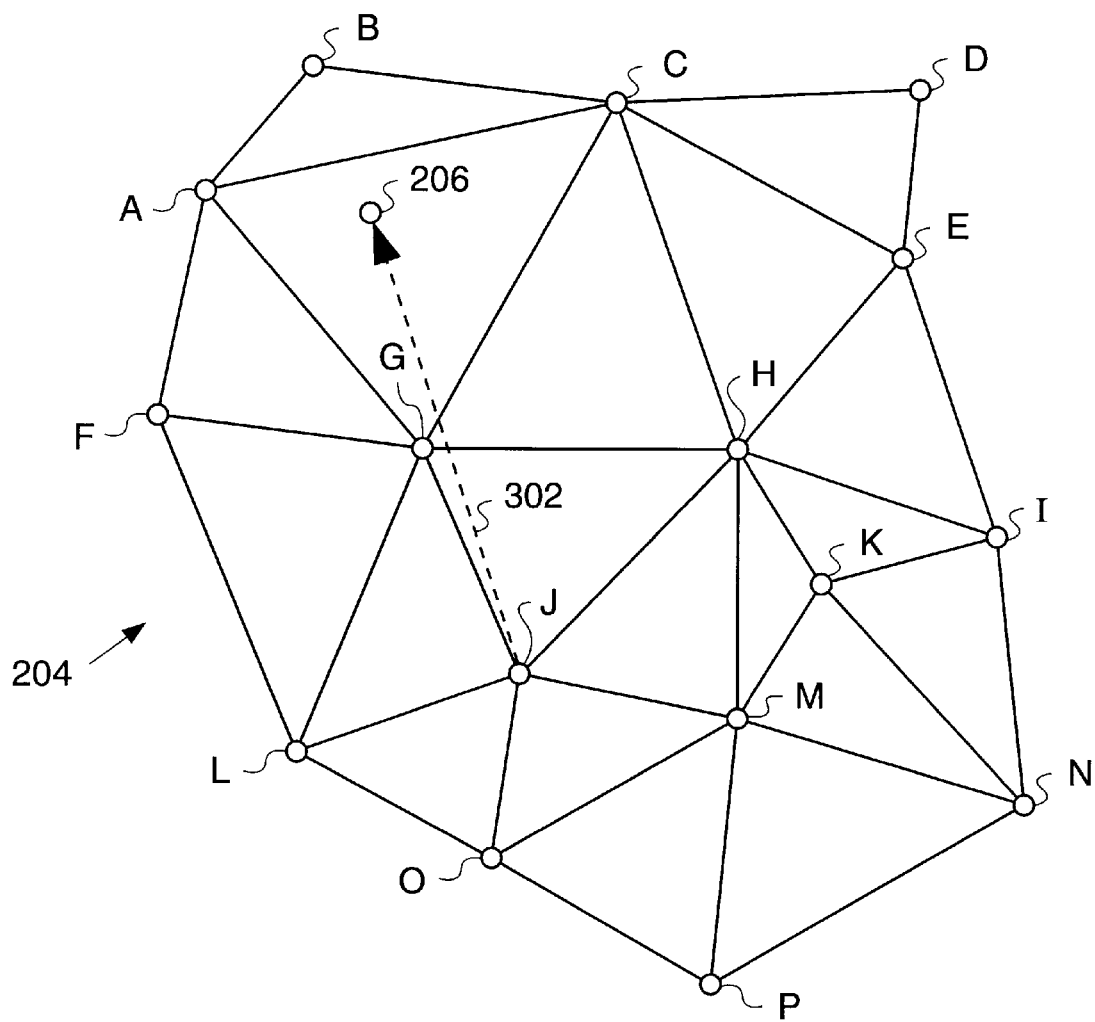
FIG. 3 is a diagrammatic representation of a database structure for representing and storing parameter values associated with a work site, illustrating a second step in determining the elevation of a current point.

With reference to FIG. 3, the second point is point J and the points linked with point J are points G, H, L, M, and O. A vector 302 between the second point and the current point 206 is determined. The first angle in a counter-clockwise direction is defined by point G. Point G becomes the third point.

In a fourth step 708 a fourth point from the set of points associated with the third point is chosen according to the predetermined rule.

Figure 4:
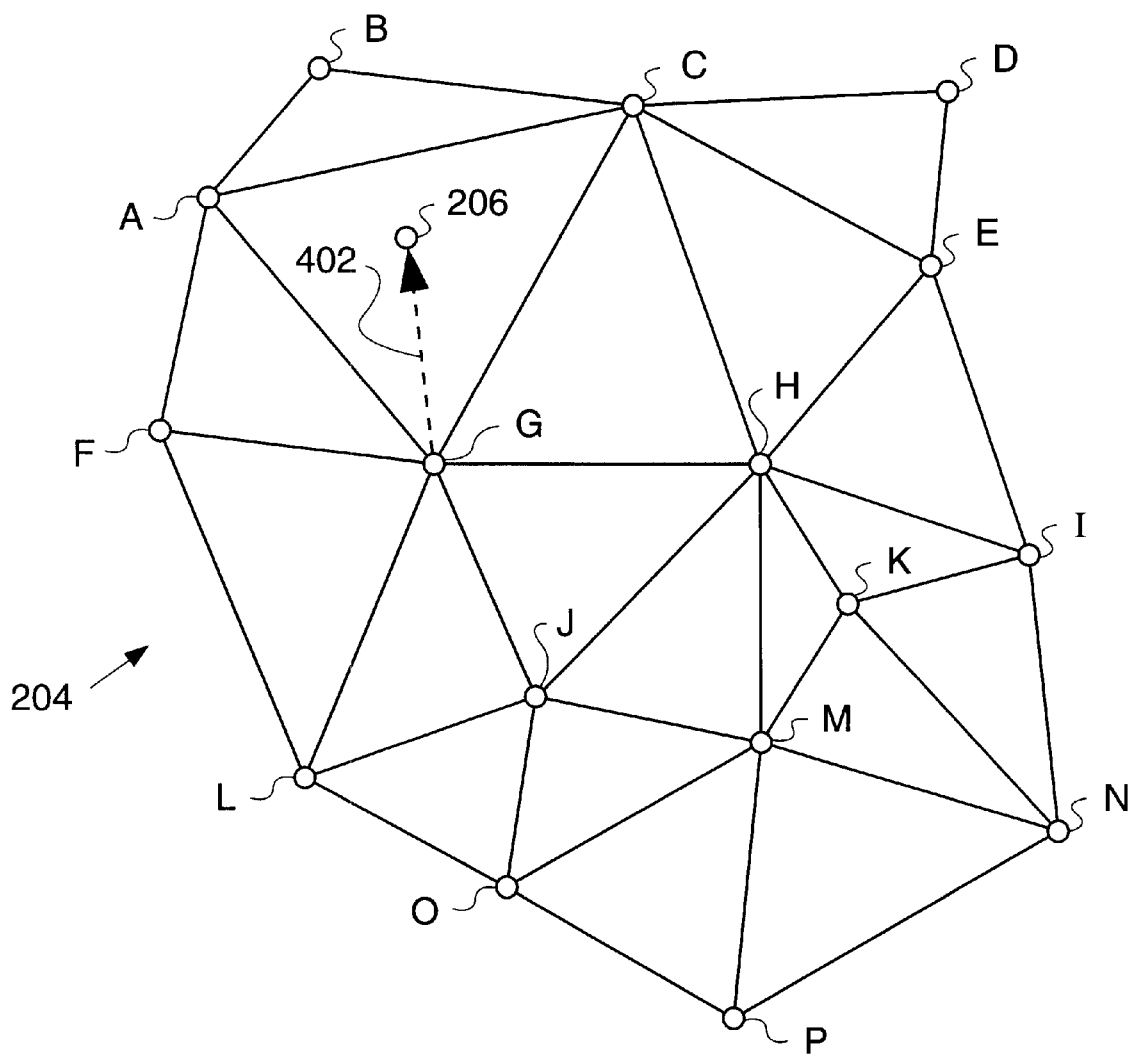
FIG. 4 is a diagrammatic representation of a database structure for representing and storing parameter values associated with a work site, illustrating a third step in determining the elevation of a current point.

With reference to FIG. 4, the third point is point G and the points linked with point G are points A, C, F, H, J, and L. A vector 402 between the third point and the current point 202 is determined. The first angle in a counter-clockwise direction is defined by point A. Point A becomes the fourth point.

This process is continued until the fourth point is equal to the first point, as is described below.

In a fifth step 710, the first and fourth points are compared. If the first and fourth points are not equal, then a new fourth point must be determined. The first point is set equal to the second point. The second point is set equal to the third point. The third point is set equal to the fourth point. And control returns to step 708 to determine a new fourth point.

Figure 5:
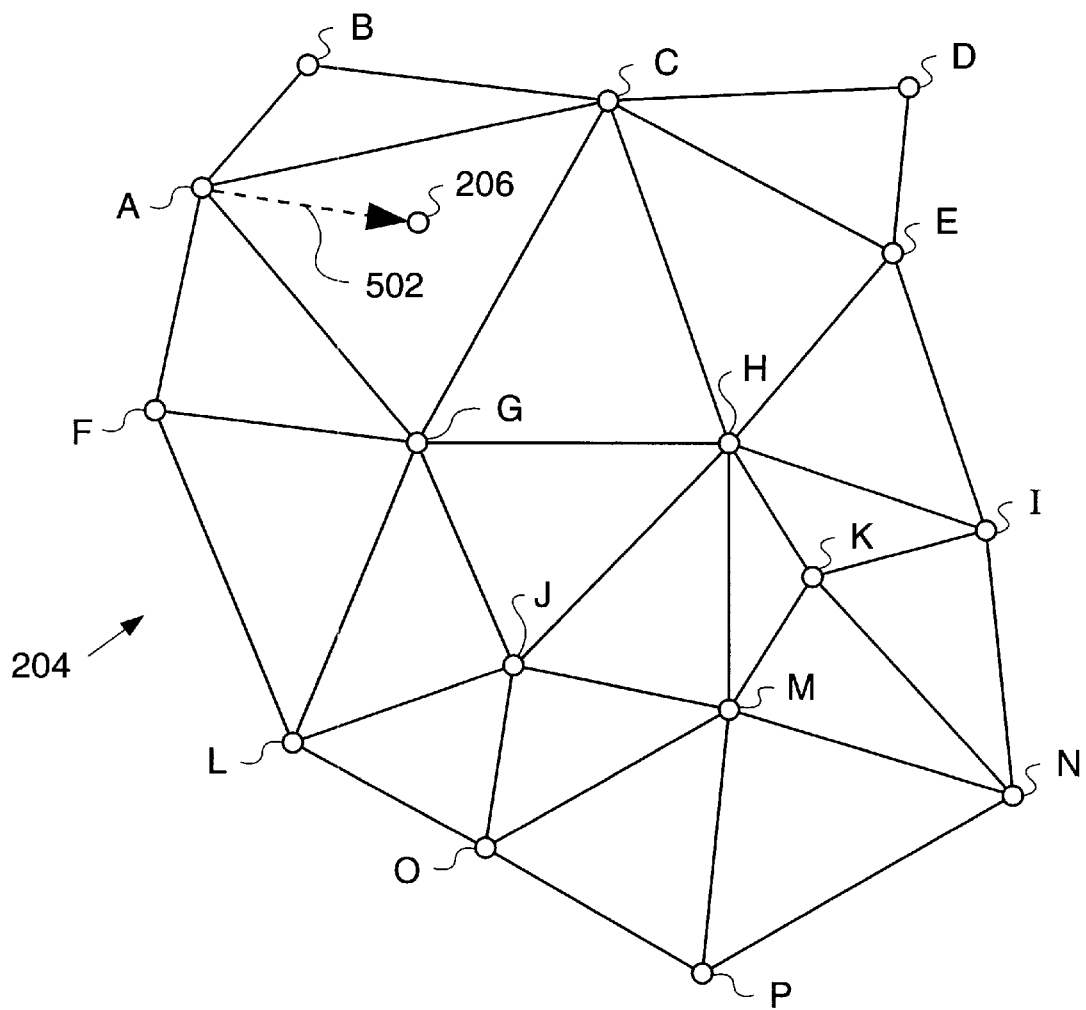
FIG. 5 is a diagrammatic representation of a database structure for representing and storing parameter values associated with a work site, illustrating a fourth step in determining the elevation of a current point.

This is illustrated in FIGS. 5 and 6. With reference to FIG. 5, the first point is point M and the fourth point is point A. Point A and Point M are not equal, so the first point is set equal to point J, the second point is set equal to point G, and the third point is set equal to point A.

A new fourth point must now be determined. A vector 502 from the third point (point A) to the current point 206 is determined. Using the predetermined rule, the fourth point is set equal to point C.

Again, the first and fourth points, points J and C, respectively, are not equal. Thus, the first point is set equal to point G, the second point is set equal to point A, the third point is set equal to point C and a new fourth point must be determined.

With reference to FIG. 6, a vector 602 from the third point (point C) to the current point 206 is determined. Using the predetermined rule, the fourth point is set equal to point G.

The first and fourth points are now equal. The current point 206 is contained in the triangle formed by the first, second, and third points (points, G, A, and C).

In sixth step 712, the elevation of the current point 206 is determined as a function of the first, second, and third points. The three-dimensional positions of the first, second and third points are known and form a plane. Using known geographical methods and the known X and Y coordinates of the current point 206, the elevation of the current point 206 is determined.

If during the determination of any point in the above method, the angle between the vector 208, 302, 402, 502, 602 and the current point is equal to the angle defined by any of the linked points, then the following steps are performed.

First, the current point is compared with the appropriate first, second, third or fourth point and the link point. If the current point is equal to one of these points, then the process is terminated and the elevation of the current point is known. If the current point is not one of these points, then it is determined if the current point is between the appropriate first, second, third, or fourth point and the link point. If the current point is between these two points, the process is terminated and the elevation of the current point is determined as a function of the line defined by the points. Otherwise the process continues as above.

INDUSTRIAL APPLICABILITY

With reference to the drawings and operation, the present invention provides an apparatus, a memory, and a method for storing data for access by an application program being executed on the controller 116 on the work machine. The data represents the elevation of the work site.

For control or display purposes, it may be necessary to determine the elevation of a current point 206. The X and Y coordinates of the current point 206 are known, but not the elevation.

Through the process above, the points defining the triangle containing the current point 206 are determined. Based on the known three-dimensional coordinates of these points and a known geographical method, the elevation of the current point is determined.

Other aspects, objects, and features of the present invention can be obtained from a study of the drawings, the disclosure, and the appended claims.

I claim:

1. A method for determining an elevation of a current point on a work site being traversed by a work machine, the current point having known X and Y coordinates, the work site being modeled in a database using a triangular irregular network, the network being composed of a plurality of points, each point having associated known X and Y coordinates and a known elevation and being associated with a set of other points in the network to form triangles, including the steps of:

(a) choosing a first point, the first point being one of the plurality of points composing the network;

(b) choosing a second point from the set of points associated with the first point according to a predetermined rule;

(c) choosing a third point from the set of points associated with the second point according to the predetermined rule;

(d) choosing a fourth point from the set of points associated with the third point according to the predetermined rule;

(e) comparing the first point to the fourth point and setting the first point equal to the second point, the second point equal to the third point, and the third point equal to the fourth point and returning to step (d) if the first point is not equal to the fourth point; and (f) determining the elevation of the current point as a function of the first, second, and third points if the first point is equal to the fourth point, and responsively directing the operation of the work machine.

2. A method, as set forth in claim 1, including the step of determining a vector between the third point and the current point.

3. A method, as set forth in claim 2, wherein the step of choosing the fourth point according to the predetermined rule includes the step of determining an angle between the vector and a predetermined vector.

4. A method, as set forth in claim 3, wherein the step of choosing the fourth point includes the step of comparing the angle between the vector and the predetermined vector with a series of angles stored with the fourth point, each angle in the series of angles associated with a linked point.

5. A method, as set forth in claim 4, wherein the step of choosing the fourth point is chosen as the link point associated with a first angle in a counter clockwise direction from the vector.

6. A method, as set forth in claim 4, wherein the step of choosing the fourth point is chosen as the link point associated with a first angle in a clockwise direction from the includes vector.

7. A method, as set forth in claim 1, wherein the steps of choosing second, third, and fourth points includes the step of determining a vector between the first, second, and third point, respectively, and the current point.

8. A method, as set forth in claim 7, wherein the steps of choosing second, third, and fourth points according to a predetermined rule includes the step of comparing the angle between the vector and the predetermined vector with a series of angles stored with the respective second, third, and fourth points, each angle in the series of angles associated with a linked point.

9. A method, as set forth in claim 8, wherein the second, third, and fourth points are chosen as the link point associated with a first angle in a counter clockwise direction from the vector.

10. A method, as set forth in claim 9, wherein the second, third, and fourth points are chosen as the link point associated with a first angle in a clockwise direction from the vector.

11. A working machine, comprising:

a position sensing system;

a controller coupled to the position sensing system, the controller calculating elevation information related to a current point on a work site as a function of a plurality of points in a Triangular Irregrular Network (TIN) model of the work site; and a directing means directing the operation of the work machine responsive to determination of the elevation information.

12. A work machine, as set forth in claim 11, wherein the directing means automatically directing operation of the work machine responsive to the elevation determination.

13. A work machine, as set forth in claim 11, wherein the directing means providing a display of a graphical representation of the work site and permit manual operation of the work machine responsive to the elevation determination.

14. A work machine, as set forth in claim 11, wherein controller determining the elevation information by choosing a first point, and then choosing second, third and fourth points according to a predetermined rule and setting the first point equal to the second point, the second point equal to the third point, and the third point equal to the fourth point if the first point is not equal to the fourth point, and determining the elevation of the current point as a function of the first, second and third points if the first point is equal to the fourth point.

15. A work machine, as set forth in claim 14, wherein the controller further choosing a new fourth point if the fourth point is not equal to the first point and re-compare the first and fourth points.

16. A work machine, as set forth in claim 14, wherein the controller determining the elevation of the current point as a function of any two of the first, second, third and fourth points if the current point is determined to be between any of the two of the first, second, third and fourth points.

17. A work machine, comprising:

a position sensing system;

a controller coupled to the position sensing system, the controller calculating elevation information related to a current point in a Triangular Irregular Network (TIN) model of a work site by choosing a first point, and then choosing second, third and fourth points according to a predetermined rule and setting the first point equal to the second point, the second point equal to the third point, and the third point equal to the fourth point if the first point is not equal to the fourth point, and determining the elevation of the current point as a function of the first, second and third points if the first point is equal to the fourth point; and a directing means directing the operation of the work machine responsive to determination of the elevation information.

* * * * *